United States Patent [19]
Hewko et al.

[11] Patent Number: 5,288,134
[45] Date of Patent: Feb. 22, 1994

[54] SEAT ASSEMBLY WITH INTEGRATED SEAT CUSHION AND SEAT TRACK FRAME

[75] Inventors: Marc D. Hewko, Canton; Duane E. Potes, Jr., Adrian, both of Mich.

[73] Assignee: Hoover Universal, Inc., Plymouth, Mich.

[21] Appl. No.: 848,131

[22] Filed: Mar. 9, 1992

[51] Int. Cl.$^5$ ............................................. A47C 7/02
[52] U.S. Cl. ................................. 297/344.1; 297/338; 297/311; 297/452.18
[58] Field of Search .............. 297/452, 344, 345, 346, 297/218, 334, 335, 311, 326, 338, 455; 248/421, 429

[56] References Cited

U.S. PATENT DOCUMENTS

| | | | |
|---|---|---|---|
| 3,273,877 | 9/1966 | Geller et al. | 297/452 |
| 4,422,611 | 12/1983 | Kitsuda | 248/421 |
| 4,583,783 | 4/1986 | Kanai | 297/452 |
| 4,715,651 | 12/1987 | Wakamatsu | 297/219 |
| 4,779,832 | 10/1988 | Rees | 248/421 |
| 4,903,931 | 2/1990 | Shimazaki | 248/421 |
| 4,969,687 | 11/1990 | Higuchi et al. | 297/452 |
| 4,973,105 | 11/1990 | Itou | 297/452 X |
| 5,007,682 | 4/1991 | Kuwabara et al. | 297/452 |

FOREIGN PATENT DOCUMENTS 3412156  10/1985  Fed. Rep. of Germany ...... 297/345

Primary Examiner—Kenneth J. Dorner
Assistant Examiner—Milton Nelson, Jr.
Attorney, Agent, or Firm—Harness, Dickey & Pierce

[57] ABSTRACT

A seat assembly with an integrated seat cushion and seat track frame in which the lateral seat cushion suspension load is transferred from the seat cushion frame to the seat track frame enabling a seat cushion frame to be constructed without a rear cross member. As a result, the weight of the seat cushion frame is reduced, without sacrificing the structural integrity of the seat assembly frame.

11 Claims, 2 Drawing Sheets

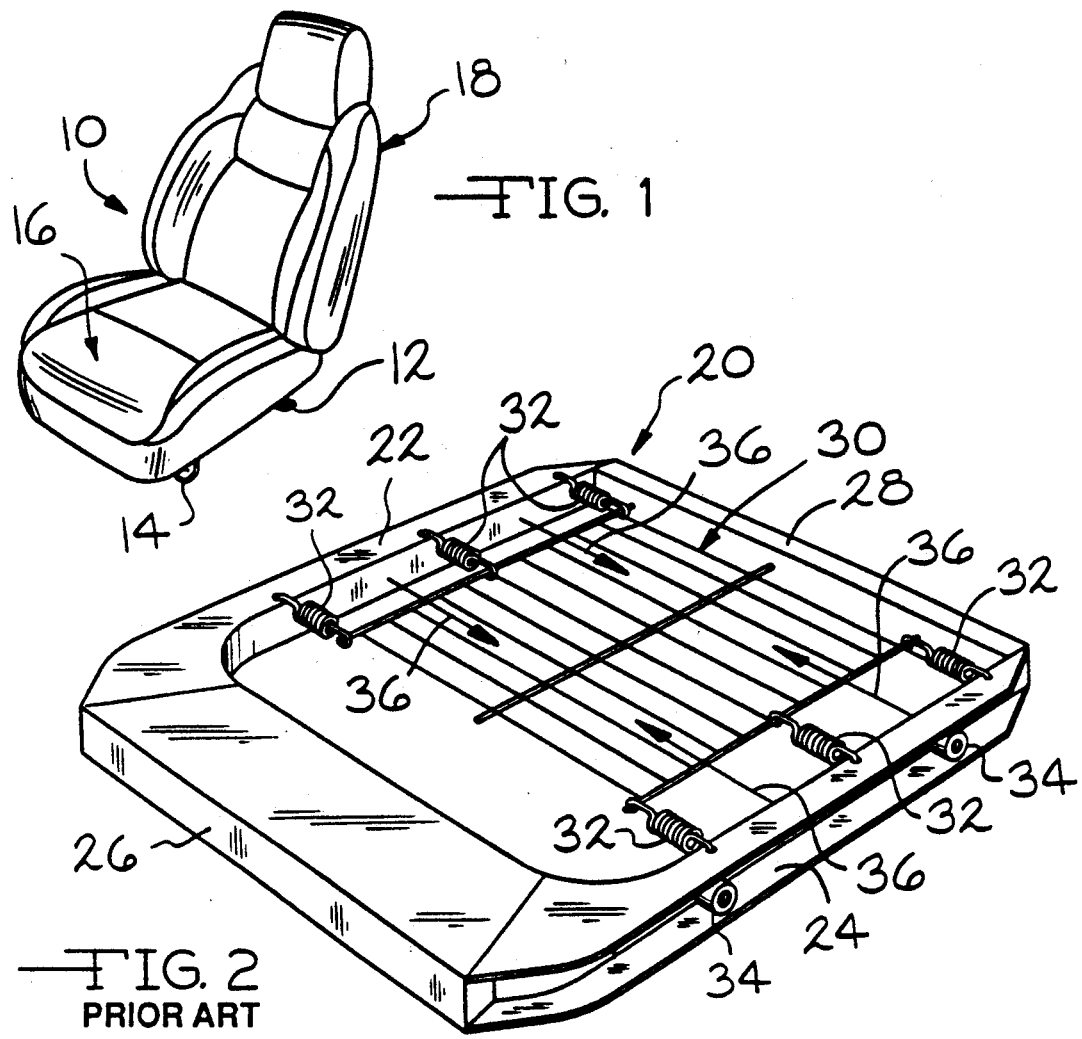
FIG. 1
FIG. 2 PRIOR ART
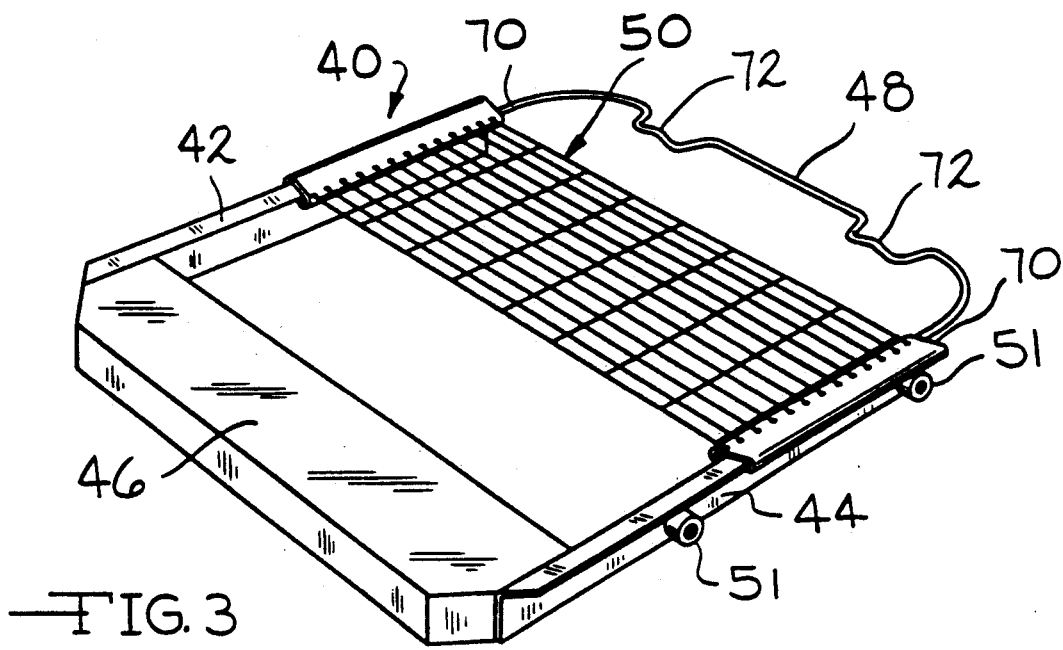
FIG. 3

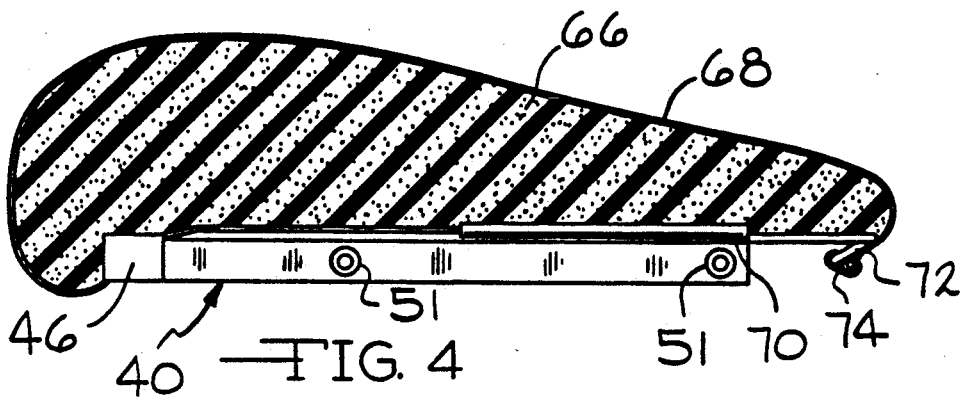
FIG. 4
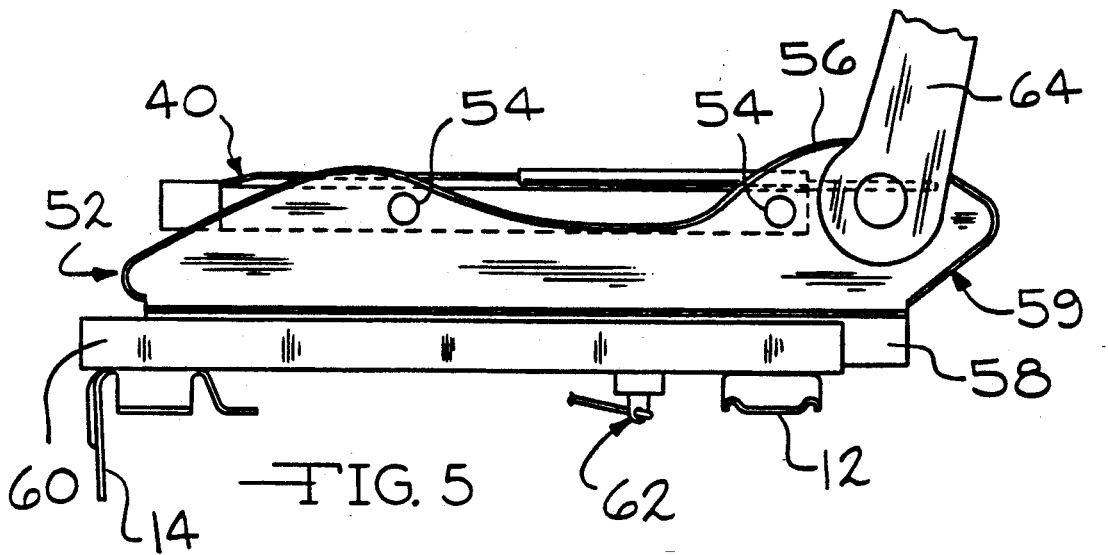
FIG. 5
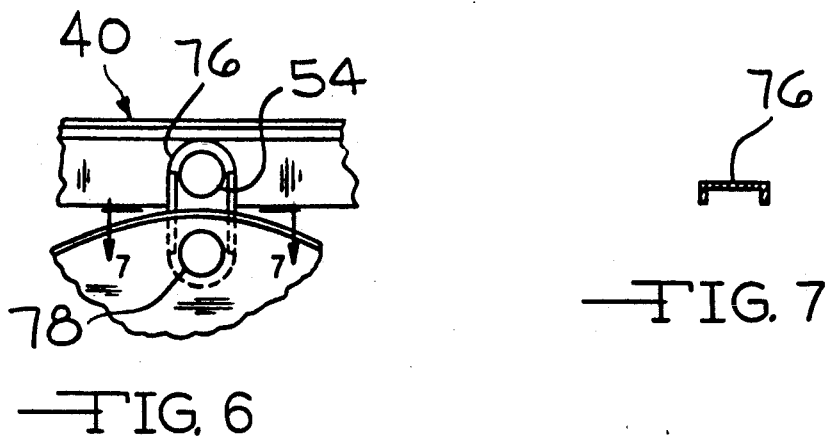
FIG. 6
FIG. 7

SEAT ASSEMBLY WITH INTEGRATED SEAT CUSHION AND SEAT TRACK FRAME

BACKGROUND AND SUMMARY OF THE INVENTION

The present invention relates to an automotive vehicle seat assembly and in particular to a seat assembly in which the seat cushion frame and the seat track frame are integrated into a single load carrying structure.

A vehicle seat assembly is typically constructed with a seat track frame that comprises, along each side of the seat assembly, a fixed rail that is mounted to the floor pan of a motor vehicle, a slide rail slidably carried fore and aft upon the fixed rail and a riser extending upwardly from the slide rail. A seat cushion frame is mounted to the risers, and serves as the support structure for the seat cushion of the seat assembly. Extending upwardly from a rear portion of the riser is a seat back frame which supports the seat back of the seat assembly.

The seat cushion frame is typically constructed of a pair of fore and aft extending side members along each side, a front cross member extending laterally between and connected to the front ends of the two side members and a rear cross member extending laterally between and connected to the rear ends of the two side members. A flexible wire seat cushion suspension extends laterally between the two side members to support a foam seat cushion pad. When the seat is occupied, the weight of the occupant produces a vertical load applied to the seat cushion suspension. This vertical load is transferred from the suspension to the side members and then to the risers in the seat track frame from where it is distributed to the floor pan of the vehicle.

The seat cushion suspension, in transferring the vertical load to the side members also creates a substantial lateral force on the side members, directed inwardly tending to urge the two side members of the cushion frame toward one another. The front and rear cross members operate to resist the lateral load without transferring the lateral load to the seat track frame. Only the vertical load is transferred to the seat track frame.

Due to a continuing desire to reduce the weight of motor vehicles, it is an object of the present invention to reduce the weight of the seat cushion frame without compromising its structural integrity.

It is a feature of the present invention that the seat cushion frame is integrated with the seat track frame, enabling the lateral suspension load to be carried by the seat track frame as well as the vertical load. This load transfer enables the rear cross member to be deleted from the seat cushion frame, thus reducing the weight of the seat cushion frame. Since the seat track frame is a structural member already designed to accommodate high loading, little, if any, reinforcement is required in the seat track frame to accommodate the lateral suspension load. Any weight increase in the seat track frame is small in comparison to the weight reduction by eliminating the rear cross member from the seat cushion frame. The total weight reduction is approximately 20 percent of the seat cushion frame weight.

Further objects, features and advantages of the invention will become apparent from a consideration of the following description and the appended claims when taken in connection with the accompanying drawings.

BRIEF DESCRIPTION OF THE DRAWING

FIG. 1 is a perspective view of a typical automotive seat assembly;

FIG. 2 is a perspective view of a prior art seat cushion frame;

FIG. 3 is a perspective view of the seat cushion frame of the present invention;

FIG. 4 is a side view of the seat cushion frame of the present invention showing the foam pad seat cushion and upholstery cover;

FIG. 5 is a side elevational view of the integrated seat cushion and frame of the present invention;

FIG. 6 is a fragmentary side elevational view of a modified embodiment of the present invention in which the seat cushion frame is vertically movable relative to the seat track frame; and FIG. 7 is a sectional view of a lift link as seen from substantially the line 7—7 of FIG. 6.

DETAILED DESCRIPTION OF THE INVENTION

FIG. 1 is a perspective view of a seat assembly containing the integrated seat cushion and seat track frame of the present invention and designated generally at 10. Seat assembly 10 includes a pair of rear mounting feet 12 and a pair of front mounting feet 14 which are used to attach the seat assembly 10 into a motor vehicle. The seat assembly includes a lower seat cushion 16 with a seat back 18 extending upwardly at the rear of the seat cushion as is well known in the art for a motor vehicle seat assembly. In seat assembly 10, the seat cushion frame is integrated with the seat track frame to reduce the overall weight of the seat assembly.

With reference to FIG. 2, a typical seat cushion frame is illustrated and designated generally at 20. The seat cushion frame 20 includes a right side member 22 and parallel left side member 24 spaced laterally therefrom. The terms left and right are used to designate left and right as installed within a motor vehicle. At the forward end of the frame 20 is a front cross member 26 and at the rear end of the frame is a rear cross member 28. A wire grid suspension 30 is mounted to the left and right side members by a plurality of springs 32 to support a foam seat cushion pad.

When the seat assembly is occupied, the weight of the occupant is carried in large part by the wire grid suspension 30. The occupant load is transferred from the grid to the side members 22 and 32 where the vertical load is then transferred through the mounting bosses 34 to the seat track frame described further below. The occupant weight also produces a lateral load in the suspension shown by the arrows 36 which acts on the side members in a direction tending to urge the two side members 22 and 24 toward one another. This lateral load 36 is resisted by the front and rear cross members 26 and 28 and is not transferred to the seat track frame.

The seat assembly 10 of the present invention integrates the seat cushion frame with the seat track frame to more efficiently manage the occupant load. This is accomplished by transferring the lateral load 36 from the seat cushion frame to the seat track frame. The benefit of doing so is that the weight of the seat cushion frame can now be reduced without effecting the structural integrity of the seat assembly.

The seat cushion frame of the present invention is shown in FIG. 3 and designated generally at 40. The seat cushion frame 40 includes a right and left side members 42 and 44 spaced laterally from one another. A front cross member 46 is attached to the front ends of the side members 42 and 44. The rear cross member of a typical seat cushion frame has been eliminated and is replaced by a stiff trim wire 48, the purpose of which will be described below. A wire grid suspension 50 is carried by the two side members 42 and 44.

The seat cushion frame 40 includes a pair of mounting bosses 51 in each of the side members 42 and 44 through which the seat cushion frame is attached to a seat track frame 52 as shown in FIG. 5. The seat track frame 52 includes a riser 56 fastened to a slide rail 58 which together form a sliding member 59. The slide rail is carried by a fixed rail 60 which includes the rear and front feet 12 and 14 for attaching the seat assembly to a vehicle. A latch mechanism 62 is provided to lock the slide rail 58 to the fixed rail 60 in a conventional manner. The fixed rail 60, slide rail 58 and riser 56 together form what is referred to as a seat track frame 52 that carries the seat cushion frame 40 as well as the seat back frame 64. Bolts 54 or other similar fasteners attach the seat cushion frame 40 to the riser 56.

The lateral suspension load 36 is largely transferred from the side members 42 and 44 to the risers 56 along each side of the seat assembly thus integrating the seat cushion frame with the seat track frame. Because the lateral load 36 is transferred to the seat track frame, a rear cross member spanning between the two side members 42 and 44 is no longer needed and can be deleted, resulting in a weight saving in the seat assembly. A portion of the lateral load may still be resisted by the front cross member 46. Because the seat track frame 52 is a load carrying member, little, if any, reinforcement is needed to enable the seat track frame to accommodate the lateral suspension load 36. As a result, the weight increase caused by any reinforcement of the seat track frame is considerably less than the weight reduction by the elimination of the rear cross member from the seat cushion frame. The overall result of the seat cushion and seat track frame integration is a decrease in the weight of the seat assembly without a reduction in the structural integrity of the seat assembly.

The trim wire 48 is necessary to provide an attachment for the seat cushion upholstery cover as shown in FIG. 4. The seat cushion includes a foam pad 66 carried on top of the seat cushion frame and extending forwardly beyond the front cross member 46. The front cross member provides support for the foam pad at the front of the seat cushion. An upholstery cover 68 covers the top foam pad and is attached along its edges to the seat cushion frame. The trim wire 48 is provided at the rear of the seat cushion frame in place of the rear cross member to provide an attachment for the upholstery cover at the rear of the seat cushion. The trim wire is welded or attached in any manner at its ends 70 to the side members 42 and 44. Laterally spaced from one another are two or more detents 72 in the trim wire that form attachment points for hog ring fasteners 74 used to attach the upholstery cover to the trim wire. The detents 72 prevent the hog ring fasteners from moving laterally along the trim wire. The detents can be co-planar with the trim wire, and preferably, the detents can be angled downward below the plane of the wire to prevent interference with occupant comfort.

FIG. 6 is an alternative embodiment of the present invention in which the seat cushion frame 40 is mounted to the riser 56 through lift levers 76 at each of the mounting bosses 51 to enable the seat cushion frame 40 to be raised and lowered relative to the riser 56. A lift mechanism (not shown) is provided to rotate the lift levers 76 about their lower pivotal attachment 78 to the riser 56 to raise and lower the seat cushion frame 40.

In typical prior art seat assemblies with a seat cushion lift, flat plates are used for the lift levers. However, since the lift levers 76 of the present invention must now accommodate the lateral suspension load 36 in addition to the vertical load, the lift levers are reconfigured to improve their bending strength. The lift levers 76 are configured with a generally U-shaped horizontal cross section as shown in FIG. 7.

The seat assembly of the present invention, with an integral seat cushion frame and seat track frame, more efficiently manages the occupant loading and transfers that loading to the vehicle body with the resultant reduction in the weight of the seat frame, without compromising the seat assembly structural integrity. As such, the seat assembly of the present invention accomplishes the objective of the present invention of reducing the seat assembly weight.

It is to be understood that the invention is not limited to the exact construction illustrated and described above, but that various changes and modifications may be made without departing from the spirit and scope of the invention as defined in the following claims.

We claim:

1. A seat assembly for a motor vehicle comprising:
a seat track frame for mounting said seat assembly to a motor vehicle, said seat track frame having laterally spaced fore and aft extending rails;
a generally planar and horizontal U-shaped seat cushion frame open at a rear end thereof formed by laterally spaced side portions extending rearwardly from a front portion, said side portions being laterally unreinforced at the rear end of said seat cushion frame, said seat cushion frame being mounted to said fore and aft extending rails of said seat track frame by connection to said side portions to said seat track frame whereby said side portions are laterally reinforced by said seat track frame at the rear end of said seat cushion frame; and
a flexible suspension extending laterally between said side portions rearwardly of said front portion, said flexible suspension supporting a vertical occupant load and transferring said occupant load to said side portions with both a vertical force component directed downwardly and lateral force components directed inwardly, a portion of the lateral force being transferred to said front portion as a compressive load in said front portion and the remainder of said lateral force being transferred from said side portions to said seat track frame.

2. The seat assembly of claim 1 wherein mounting means for attaching said seat cushion frame to said seat track frame includes a plurality of lift links with two ends each having one end pivotally connected to said seat cushion frame and an opposite end pivotally coupled to said seat track frame for enabling said seat cushion frame to be raised and lowered relative to said seat track frame, said lift links having a generally U-shaped horizontal cross section.

3. The seat assembly of claim 1 further comprising a foam pad seat cushion supported by said flexible suspension, an upholstery cover on said foam pad and means for attaching said cover to said seat cushion frame at the rear end of said seat cushion frame.

4. The seat assembly of claim 3 wherein said means for attaching said upholstery cover to said seat cushion frame includes at the rear end of said seat cushion frame a cover attaching member having two ends connected to said side portions at the rear end of said seat cushion frame and extending laterally therebetween.

5. The seat assembly of claim 4 wherein said cover attachment member is a wire member including at least one detent at which said upholstery cover is coupled to said wire member by a wire ring.

6. The seat assembly for a motor vehicle having a seat cushion with front and rear ends and lateral sides and a seat back extending upwardly at the rear end of said seat cushion, said seat assembly comprising:

a seat track frame for mounting said seat assembly to a motor vehicle, said seat track frame including means for moving said seat assembly fore and aft relative to said motor vehicle and said seat track frame having fore and aft extending rails adjacent the lateral sides of said seat cushion;

a seat back frame mounted to said seat track frame and extending upwardly therefrom;

a generally U-shaped seat cushion frame having a front and rear including laterally spaced side members with front and rear ends and a front cross member extending laterally between and connected to the front ends of said side members to laterally restrain said side members at said front ends, said side members being laterally unreinforced at said rear ends, said seat cushion frame being mounted to said fore and aft extending rails of said seat track frame by connection of said side members to said seat track frame whereby said seat track frame laterally reinforces said side members at the rear ends thereof; and a flexible suspension extending laterally between said side members rearwardly of said front cross member, said flexible suspension supporting a vertical occupant load and transferring said occupant load to said side members with both a vertical force component directed downwardly and lateral force components directed inwardly, a portion of the lateral force being transferred to said front cross member as a compressive load in said front cross member and the remainder of said lateral force being transferred from said side members to said seat track frame rails.

7. The seat assembly of claim 6 wherein said seat cushion frame is mounted to said seat track frame by a plurality of lift links each having one end pivotally connected to said seat cushion frame and an opposite end pivotally connected to said seat track frame for enabling said seat cushion frame to be raised and lowered relative to said seat track frame, said lift links having a generally U-shaped horizontal cross section.

8. The seat assembly of claim 6 further comprising a foam pad carried by said flexible suspension, an upholstery cover on said foam pad and means for attaching said cover to said seat cushion frame at the rear of said seat cushion frame.

9. The seat assembly of claim 8 wherein said means for attaching said upholstery cover to the rear of said seat cushion frame includes a cover attachment member having two ends connected to the rear ends of said seat cushion frame side members and extending laterally therebetween.

10. The seat assembly of claim 9 wherein said cover attachment member is a wire member of irregular shape including at least one detent at which said upholstery cover is coupled to said wire member.

11. The seat assembly of claim 10 wherein said wire member defines a plane and said at least one detent is inclined downwardly from said plane.

* * * * *